Patented May 5, 1953

2,637,697

UNITED STATES PATENT OFFICE 2,637,697

LUBRICATING OIL ADDITIVE

Jeffrey H. Bartlett, Westfield, N. J., assignor to Standard Oil Development Company, a corporation of Delaware No Drawing. Application December 30, 1948, Serial No. 68,377

13 Claims. (Cl. 252—56)

This invention relates to novel chemical products and to the process for preparing and using the same. Most particularly it relates to high molecular weight polymers of diolefinic carboxylic acid esters wherein the esterification agent is a saturated alcohol. A further embodiment of the invention is to be found in copolymers of polymerizable organic compounds and said diolefinic carboxylic acid esters. These novel polymers or copolymers are especially useful for improving the pour point and viscosity index and other properties of lubricating oils.

One object of the present invention is the production of pour depressants of high potency in a wide variety of lubricating oils. Further objects are the production of additives which are suitable for penetrating oils, extreme pressure lubricants, greases, coating compositions, asphalt wetting agents and the like.

For these products to be active as pour depressants in mineral lubricating oils, it is essential that the polyesters contain long hydrocarbon chains of from 10 to 24 carbon atoms. In the case of simple polymerized esters, the long chain hydrocarbon is generally supplied by a suitable alcohol. Where the product consists of a copolymer of a diolefinic carboxylic acid ester and another polymerizable compound, it may be supplied by either reactant. In any case, it is necesary that there be present at least one solubilizing hydrocarbon chain longer than $C_8$, preferably in the $C_{10}$ to $C_{20}$ range. The preferred average chain length of the solubilizing groups depends somewhat on the lubricating oil with which the product is used. For example, in the case of light oils of SAE 10 grade which have been heavily dewaxed to relatively low pour and cloud points, relatively straight chain solubilizing groups of $C_8$ and greater should average in the $C_{11}$ to $C_{14}$ range, whereas in the case of more lightly dewaxed products, an average of $C_{13}$ to $C_{16}$ may give optimum pour point depression. Solubilizing groups of less than $C_8$ have a definite but relatively smaller effect than the larger groups on the potency of products as pour depressants. It has also been found that different size groups are required if the groups are highly branched such as those derived from alcohols prepared by the Oxo reaction of polypropylene with carbon monoxide and hydrogen.

Among the esters which may be employed are those of sorbic acid,

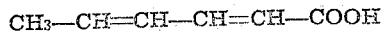

beta vinyl acrylic acid,

and other alpha-beta unsaturated diolefinic acids. It is preferred to employ acids in which the number of carbon atoms is between 5 and about 10, the upper limit being fixed by the ease of polymerization or copolymerizaton. The straight chain acids are preferred, although slightly branched acids are also suitable, particularly if branching occurs on the alpha carbon atom to the carboxyl group. The unsaturated acids that have two olefinic groups in a conjugated system are particularly useful.

Particularly suitable as an esterification agent is a commercially available mixed alcohol obtained by hydrogenation of coconut oil. This product is sold under the trade name "Lorol" and is a mixture of saturated straight chain alcohols ranging from 10 to 18 carbon atoms but having a major proportion of lauryl alcohol which has 12 carbon atoms. Other related products are made by separating this material, which may be considered as a crude mixture, into several different fractions having a relatively higher proportion of the higher, lower, or medium constituent thereof. The composition of Lorol per se and related products, "Lorol B" and "Lorol R," is approximately as follows:

*Composition of mixtures of commercial alcohols*

|  | Lorol | Lorol B | Lorol R |
|---|---|---|---|
| $C_{10}$-----------percent-- | 4 | 3 | 1 |
| $C_{12}$-----------do---- | 55.5 | 46 | 85 |
| $C_{14}$-----------do---- | 22.5 | 24 | 13 |
| $C_{16}$-----------do---- | 14 | 10 | 1 |
| $C_{18}$-----------do---- | 4 | 17 | -------- |
| Average Number of Carbon Atoms. | 12.8 | 13.5 | 12.2 |

Copolymers of the above esters are obtained by reaction with various types of unsaturated materials among which are vinyl esters, vinyl halides, vinyl ethers, vinyl ketones, fumarates, maleates, itaconates, acrylates, methacrylates, styrene and the like. If long straight chains are provided in the co-monomers, greater freedom may be exercised in using short chain esters of the diolefinic acid.

It is further within the comprehension of this invention to react the polymers or copolymers with various reagents which will combine with either part or all of the remaining olefinic groups. Among these reagents are sulfuric acid and fuming sulfuric acid which yield sulfates or sulfonates, thus providing a possibility of producing metal salts, for example, those of Ba, Ca, Sr, Mg, Al, etc., which are useful as lubricating oil additives. Sulfur halides or phosphorus sulfides may also be combined with the olefinic groups.

In the case of the products from the phosphorus sulfides, metal salts may be prepared which are valuable as lubricating oil additives.

Various methods of polymerization and copolymerization may be used, involving either mass or emulsion technique. Heat and pressure may be used with or without the presence of a catalyst. In the mass polymerization or copolymerizations such catalysts as peroxides, light, oxygen, ozone, clay, boron fluoride, aluminum chloride, sodium and the like may be used. Benzoyl peroxide is generally preferred for this reaction.

The reaction is generally accomplished in a period ranging from 2 to 100 hours, depending on catalyst and temperature conditions which may range from 50° to 150° C. Inert solvents such as naphtha, light lubricating oil, chloroform, and the like may be used in order to control reaction rate or product molecular weight, but are not generally required.

The invention will better be understood from a consideration of the following examples:

Example I

A 3 liter three-necked flask equipped with a water trap and a reflux condenser was charged with 353 g. sorbic acid (3.15 mols), 625 g. Lorol B alcohol (3.0 mols), 3 g. of sulfosalicylic acid and 500 c. of naphtha. The above mixture was refluxed for 21 hours during which 52.5 cc. of water was collected. The reaction product was diluted with 500 cc. of benzol and was given three washes with a 5% solution of sodium carbonate in water. The solvents were substantially removed by first heating on a steam bath followed by the use of nitrogen and a vacuum at 100° C. The resulting ester had a saponification value of 186 and a neutralization number of 1.66 and a viscosity of 46.5 SUS at 210° F.

Three samples of the above ester were charged in a 25 x 200 mm. test tube from which air was displaced by means of nitrogen. Catalyst was added to each and the resulting mixtures blown again with nitrogen until the catalyst was dissolved. The test tubes were stoppered and placed in an oven for polymerization. The temperature and catalyst specifications for polymerizing the above samples are as follows:

| | Temp., °C. | Time, Hrs. | Weight Percent Catalyst | Polymer Vis. at 210° F., SUS |
|---|---|---|---|---|
| Sample A | 60 | 66 | 5.0 benzoyl peroxide | 339 |
| Sample B | 115 | 16 | 0.0 | 240 |
| Sample C | 125 | 16 | 4.0 cumene hydroperoxide | 439 |

Example II n-Decyl ester of sorbic acid was prepared in accordance with the procedure of Example I. A sample of n-decyl sorbate was charged in a test tube from which the air was displaced by nitrogen after which 5.0 weight per cent of powdered benzoyl peroxide was added. The resulting mixture was again blown with nitrogen and the peroxide was dissolved. The test tube was then stoppered and placed in an oven at 80° C. for 16 hours. At the end of the time, the resulting polymers had a viscosity of 163 SUS at 210° F.

Example III

Cetyl ester of sorbic acid was prepared in accordance with procedure of Example I. A sample of cetyl sorbate was charged in a test tube, the tube was then stoppered and placed in an oven at 100° C. for 66 hours. At the end of this time the resulting polymers had a viscosity of 390 SUS at 210° F.

Example IV n-Tetradecyl ester of sorbic acid was prepared in accordance with the procedure of Example I. A test tube was charged with n-tetradecyl sorbate and the air displaced with nitrogen by blowing, after which 5.0 weight per cent of powdered benzoyl peroxide was added. The resultant mixture was again blown with nitrogen until the peroxide was dissolved. The test tube was then stoppered and placed in an oven at 80° C. for 16 hours. At the end of this time, the resulting polymer had a viscosity of 305 SUS at 210° F.

Example V

Samples of n-octyl sorbate and stenol sorbate were prepared in accordance with the procedure of Example I. A mixture containing 48 weight per cent n-octyl sorbate and 52 weight per cent stenol sorbate was charged in a test tube and polymerized in accordance with the procedure of Example I, using 5.0 weight per cent benzoyl peroxide as a catalyst and heating to 80° C. for a period of 16 hours.

Example VI

Samples of n-decyl sorbate and n-tetradecyl sorbate, prepared in accordance with Examples II and IV, were mixed together to obtain a solution containing 45 weight per cent n-decyl sorbate and 55 weight per cent of n-tetradecyl sorbate and polymerized in accordance with procedure of Example I, using 5.0 weight per cent benzoyl peroxide as a catalyst and heating to a temperature of 80° C. for a period of 16 hours.

Example VII

A mixture of 80 weight per cent Lorol B sorbate, obtained in accordance with the procedure of Example I, and 20 weight per cent of vinyl acetate were charged in a test tube and copolymerized in accordance with the procedure described in Example I, using 5.0 weight per cent benzoyl peroxide as a catalyst and heating to a temperature of 80° C. for a period of 42 hours.

Example VIII

A copolymerized product of 80 weight per cent Lorol B sorbate and 20 weight per cent styrene was obtained following the procedure of Example VII, heating to a temperature of 80° C. for a period of 18 hours. The resulting product had a viscosity of 560 SUS at 210° F.

Example IX

Example VIII was repeated, using 70 weight per cent Lorol B sorbate and 30 weight per cent styrene. The resulting copolymer had a viscosity of 1440 SUS at 210° F.

Example X

Example IX was repeated, using a mixture of 80 weight per cent Lorol B sorbate and 20 weight per cent methyl acrylate. The reaction time was 42 hours and the resulting copolymer had a viscosity of 471 SUS at 210° F.

Example XI

Example X was repeated, using a mixture of 80 weight per cent Lorol B sorbate and 20 weight per cent butyl itaconate. The resulting copolymer had a viscosity of 182 SUS at 210° F.

The polymeric materials obtained by the procedures of Example I to XI were evaluated by blending in test oils and the pour points of the blends obtained by standard ASTM methods. The test oils used had the following characteristics: Oil A was a Pennsylvania 180 neutral; oil B was an extracted Mid-Continent neutral plus bright stock having a viscosity index of 103 and a viscosity of 46.1 SUS at 210° F.; oil C was a Mid-Continent neutral plus 3.5% Pennsylvania bright stock; Oil D was an extracted Mid-Continent neutral plus bright stock and having a viscosity index of 114 and viscosity of 46 SUS at 210° F. The blends were evaluated with the following results:

| Composition | Polymer Conc. Wt. Percent | ASTM Pour Point, °F. | | | |
|---|---|---|---|---|---|
| | | Oil A | Oil B | Oil C | Oil D |
| Neutral Test Oil | | +10 | +20 | +30 | +5 |
| Lorol B sorbate, Sample A | 0.2 | | −20 | +30 | −20 |
| Lorol B sorbate, Sample B | 0.5 | −30 | −20 | +30 | |
| Lorol B sorbate, Sample C | [1] 0.1 | −30 | −20 | +25 | |
| n-Decyl sorbate | 0.5 | +5 | +20 | +30 | |
| Cetyl Sorbate | 0.5 | | −15 | +5 | |
| n-Tetradecyl sorbate | 0.5 | −15 | −15 | −25 | |
| | [1] 0.1 | −15 | −20 | −10 | |
| n-Octyl sorbate, 48%, Stenol sorbate, 52% | 0.5 | +10 | −10 | +10 | |
| n-Decyl sorbate, 45%, n-Tetradecyl sorbate, 55% | 0.5 | −10 | −20 | +30 | |
| | [1] 0.1 | −10 | −25 | +30 | |
| Lorol B sorbate, 80%, Vinyl acetate, 20% | 0.2 | −15 | −20 | +30 | |
| Lorol B sorbate, 80%, Styrene, 20% | 0.2 | −5 | −5 | +30 | |
| Lorol B sorbate, 70%, Styrene, 30% | 0.2 | −5 | +10 | +30 | |
| Lorol B sorbate, 80%, Methyl acrylate, 20% | 0.2 | −15 | −20 | +30 | |
| Lorol B sorbate, 80%, Butyl itaconate, 20% | 0.2 | 0 | +10 | +30 | |

[1] Unreacted monomer extracted.

What is claimed is:

1. A polymeric material consisting of the polymerization product of an ester of a $C_5$ to $C_{10}$ alpha beta unsaturated diolefinic carboxylic acid wherein the alcohol radical of the ester group contains from 8 to 18 saturated carbon atoms and a polymerizable compound selected from the class consisting of said ester and vinyl esters and vinyl ethers.

2. A product consisting of a copolymer of a polymerizable organic compound containing a vinyl group selected from the class consisting of vinyl esters and vinyl ethers and an ester of a $C_5$ to $C_{10}$ alpha beta unsaturated diolefinic carboxylic acid having from 5 to 10 carbon atoms wherein the alcohol radical of the ester group contains from 8 to 18 saturated carbon atoms.

3. A product consisting of a copolymer of vinyl acetate and an ester of a $C_5$ to $C_{10}$ alpha beta unsaturated diolefinic carboxylic acid wherein the alcohol radical of the ester group contains from 12 to 16 carbon atoms.

4. A product consisting of a copolymer of a vinyl acetate and a hydrogenated coconut oil alcohol ester of sorbic acid.

5. A composition consisting essentially of a mineral lubricating oil having combined therein from 0.05 to 10% of a polymerized ester of a $C_5$ to $C_{10}$ alpha beta unsaturated diolefinic carboxylic acid, the alcohol radical of said ester group containing from 8 to 18 carbon atoms.

6. A composition consisting essentially of a mineral lubricating oil and from 0.05 to 10% by weight based on the oil of a copolymer of a polymerizable organic compound containing a vinyl group selected from the class consisting of vinyl esters and vinyl ethers and an ester of a $C_5$ to $C_{10}$ alpha beta unsaturated diolefinic carboxylic acid, the alcohol radical of said ester group containing from 8 to 18 carbon atoms.

7. A composition consisting essentially of a mineral lubricating oil having combined therein from 0.05 to 10% by weight based on the lubricating oil of a polymerized ester of sorbic acid wherein the alcohol radical of the ester group consists of 8 to 18 saturated carbon atoms.

8. A composition as in claim 7 wherein the alcohol radical of the ester group consists of 12 to 16 saturated carbon atoms.

9. A composition consisting essentially of a mineral lubricating oil and 0.05 to 10% by weight based on the oil of a hydrogenated coconut oil alcohol ester of sorbic acid.

10. A composition consisting essentially of a mineral lubricating oil having combined therein from 0.05 to 10% by weight based on the lubricating oil of a copolymer of vinyl acetate and an ester of sorbic acid wherein the alcohol radical of the ester group contains from 8 to 18 linear saturated carbon atoms.

11. A composition as in claim 10 wherein the alcohol radical of the ester group contains from 12 to 16 carbon atoms.

12. A mineral lubricating oil containing a minor amount of a polymerized ester of sorbic acid corresponding to the formula $$CH_3CH=CH-CH=CH-COOR$$

where R is an alkyl group of from 10 to 18 carbon atoms.

13. As a new composition of matter a polymerized ester of sorbic acid corresponding to the formula $$CH_3 \cdot CH=CH-CH=CH-COOR$$

where R is an alkyl group having from 10 to 18 carbon atoms.

JEFFREY H. BARTLETT.

References Cited in the file of this patent

UNITED STATES PATENTS

| Number | Name | Date |
|---|---|---|
| 2,149,857 | Mikeska | Mar. 7, 1939 |
| 2,327,705 | Frolich | Aug. 24, 1943 |
| 2,342,113 | Blair | Feb. 22, 1944 |
| 2,363,792 | Jahn | Nov. 28, 1944 |
| 2,375,516 | Blair | May 8, 1945 |

FOREIGN PATENTS

| Number | Country | Date |
|---|---|---|
| 387,381 | Great Britain | Feb. 6, 1933 |
| 739,082 | Germany | Aug. 5, 1943 |

OTHER REFERENCES

Hautz et al.: Jour. Am. Chem. Soc., 1614 (1933), 55.